(No Model.)
2 Sheets—Sheet 1.

L. A. DISBROW.
COMBINED CHURN AND BUTTER WORKER.

No. 564,978.
Patented Aug. 4, 1896.

Witnesses.
C. F. Kilgore
D. D. Merchant

Inventor.
Levi A. Disbrow
By his Attorney.
Jas. F. Williamson

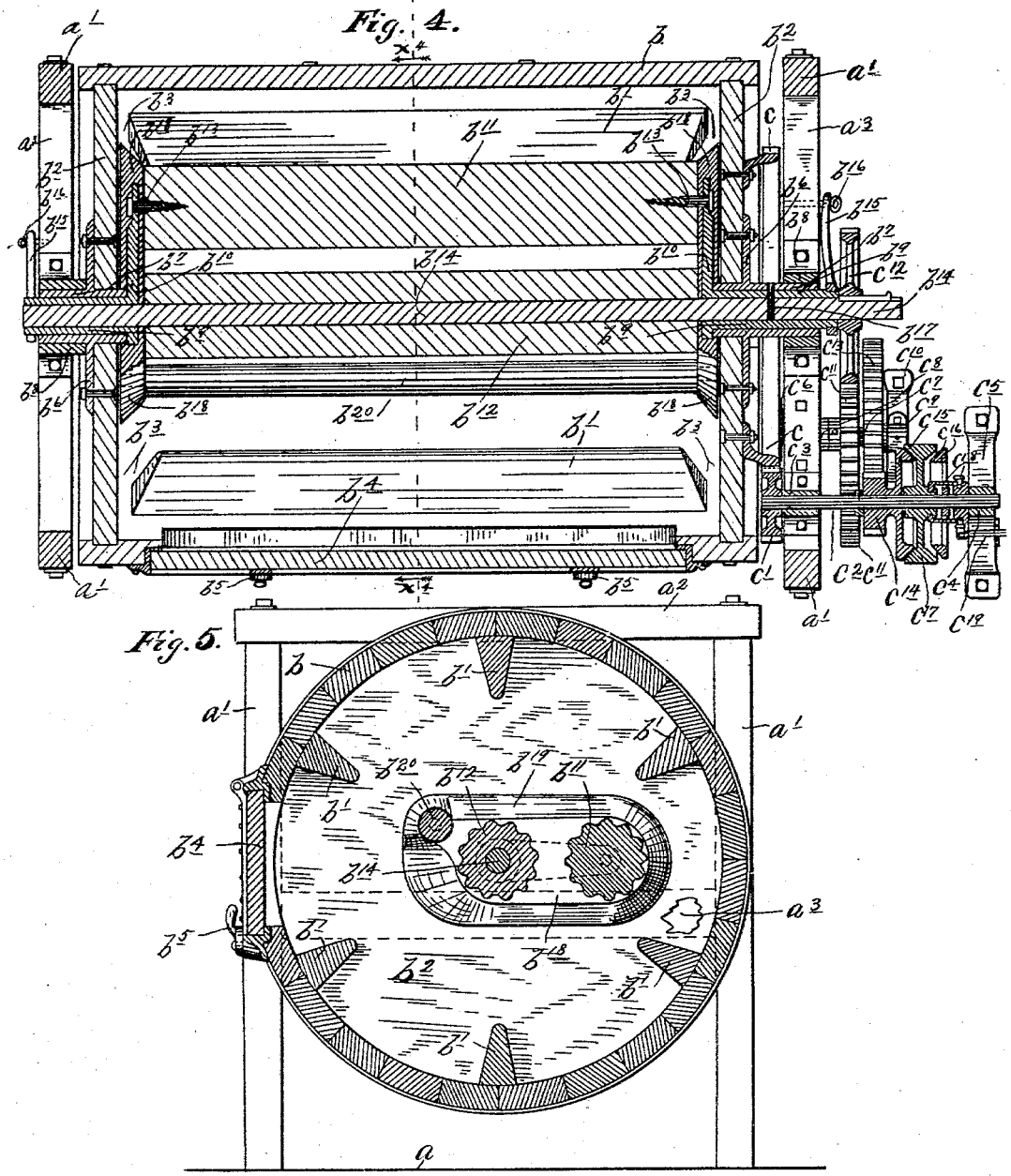

UNITED STATES PATENT OFFICE.

LEVI A. DISBROW, OF OWATONNA, MINNESOTA, ASSIGNOR, BY DIRECT AND MESNE ASSIGNMENTS, OF TWO-THIRDS TO REUBEN B. DISBROW, OF SAME PLACE, AND DARIUS W. PAYNE, OF MINNEAPOLIS, MINNESOTA.

COMBINED CHURN AND BUTTER-WORKER.

SPECIFICATION forming part of Letters Patent No. 564,978, dated August 4, 1896.

Application filed October 25, 1895. Serial No. 566,824. (No model.)

*To all whom it may concern:*

Be it known that I, LEVI A. DISBROW, a citizen of the United States, residing at Owatonna, in the county of Steele and State of Minnesota, have invented certain new and useful Improvements in a Combined Churn and Butter-Worker; and I do hereby declare the following to be a full, clear, and exact description of the invention, such as will enable others skilled in the art to which it appertains to make and use the same.

My invention has for its object to provide an improvement in combined churns and butter-workers.

The machine is especially designed to be operated by power, for use in creameries, but may of course be made of a size suitable for operation by hand. The machine may also be applied for other purposes, such as kneading dough or other plastic materials.

To the end above noted my invention consists of the novel devices and combinations of devices which will be hereinafter described, and defined in the claims.

My improved machine is illustrated in the accompanying drawings, wherein, like letters referring to like parts throughout—

Figure 1:
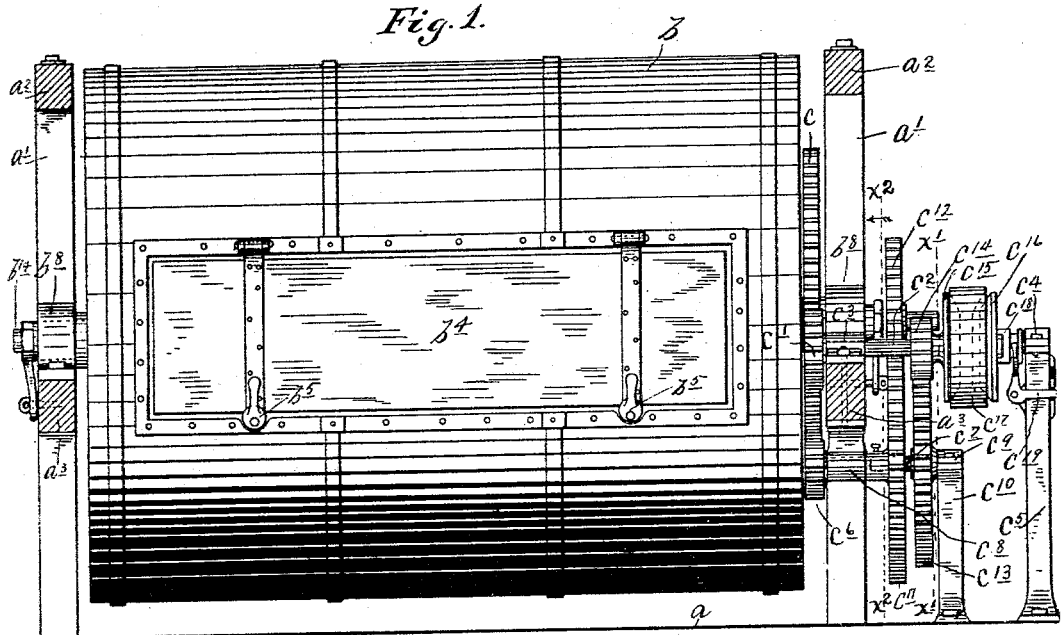
Figure 2:
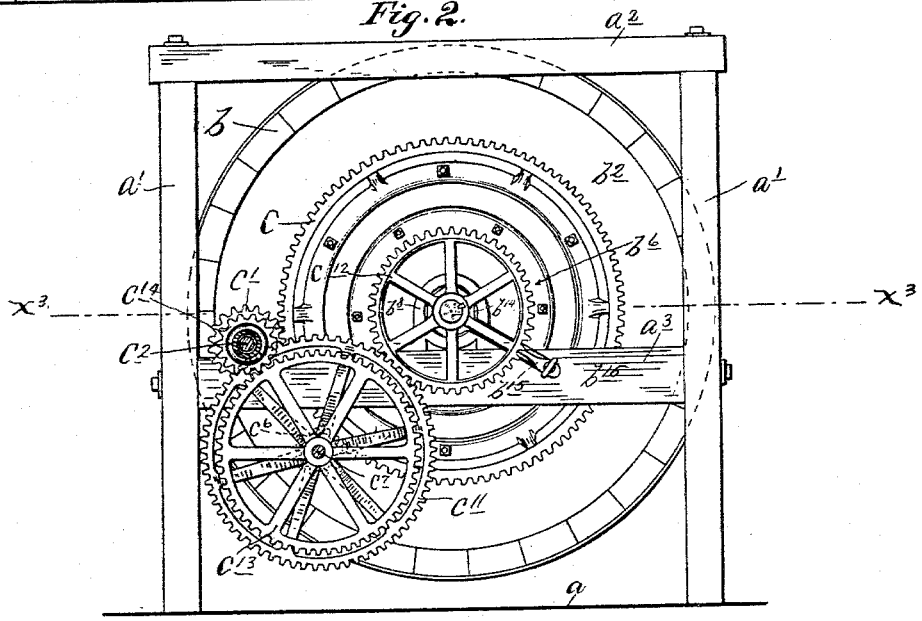
Figure 3:
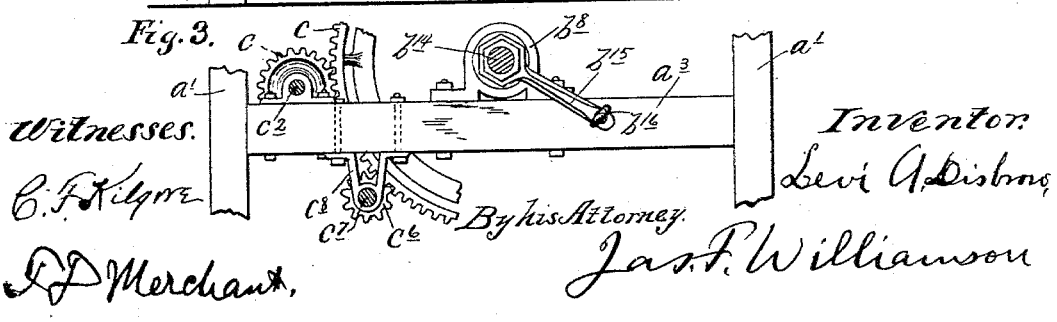

Figure 1 is a side elevation of the complete machine. Fig. 2 is a view, chiefly in right-end elevation, but partly in section, on the line $x'$ $x'$ of Fig. 1. Fig. 3 is a detail in section on the line $x^2$ $x^2$ of Fig. 1 with some parts broken away. Fig. 4 is a horizontal section through the entire machine on the line $x^3$ $x^3$ of Fig. 2. Fig. 5 is a vertical cross-section on the line $x^4$ $x^4$ of Fig. 4.

$a$ represents the floor-line in a building. $a'$ represent uprights, and $a^2$ $a^3$ horizontal pieces connected thereto, which parts together constitute end frames, in which the working parts are mounted.

The drum-body $b$ is provided on its interior with inwardly-projecting radial cleats $b'$, of angular form in cross-section, and is closed at both ends by tight heads $b^2$. The cleats $b'$ extend near to but stop short of the heads $b^2$ and are beveled at their ends, so as to form an inwardly-flaring annular space $b^3$ between the ends of the cleats $b'$ and the heads $b^2$. The body of the drum or cylinder is provided with a door $b^4$, adapted to be locked in its closed or working position by eccentric clamps $b^5$ in the usual or any suitable way.

To the drumheads $b^2$ are bolted or otherwise secured central disk-like castings $b^6$, which are provided with hollow journals or gudgeons $b^7$, extending through the drumheads and mounted in suitable bearings $b^8$, fixed to the frame-pieces $a^3$.

Within the gudgeons $b^7$ are mounted the hollow axial arms $b^9$ of crank-like hangers $b^9$ $b^{10}$, the other or radial arms $b^{10}$ of which hangers are located within the drum. To the radial arms $b^{10}$ of said crank-like hangers is journaled the outer or idle member $b^{11}$ of a pair of working rollers $b^{11}$ $b^{12}$. The journals $b^{13}$ for the said idle-roller $b^{11}$ are shown as formed by headed screws working through suitable passages in the hanger-arms $b^{10}$ and tapped into the ends of the roller $b^{11}$. The inner roller $b^{12}$ is mounted rigidly on a central shaft $b^{14}$, which extends outward through the hollow axial arms $b^9$ of the crank-hangers $b^9$ $b^{10}$, as best shown in Fig. 4. The axial arms $b^9$ of the said hangers are provided at their outer ends with lever-arms $b^{15}$, which are rigid therewith and are adapted to be secured to the fixed framework by pins $b^{16}$, engageable with suitable holes in the frame-pieces $a^3$ on opposite sides of the axis of the drum, as shown in Fig. 4.

The gudgeons $b^7$, the axial arms $b^9$ of the crank-like hangers, and the central shaft $b^{14}$ are provided with registering sections of a common pin-hole $b^{17}$, into which the pin $b^{16}$ may be inserted to lock the crank-like hangers $b^9$ $b^{10}$ and the central shaft $b^8$ to the drum-gudgeons $b^7$ for a common rotary movement altogether in the churning action. When the pins $b^{16}$ are applied, as shown in Fig. 4, the crank-like hangers $b^9$ $b^{10}$ will be held stationary in respect to the rotary movement of the drum, which is the relation sustained by the said parts when working the butter, as will presently more fully appear.

The crank-like hangers $b^9$ $b^{10}$ are covered inside the drum by radial wooden shields or covers $b^{18}$, which are constructed to fit over the radial arms $b^{10}$ of the said hangers, as shown in Figs. 4 and 5. The said covers $b^{18}$ are of an area to extend beyond the rollers $b^{11}$ $b^{12}$ in every direction and are provided with outwardly flaring or beveled surfaces $b^{19}$ on their rims, which work within the reversely-flaring annular spaces $b^3$ between the cleats $b'$ and the drumheads $b^2$.

In the covers $b^{18}$, above the central roller $b^{12}$ and on the side of the same opposite to the roller $b^{11}$, is mounted an idle-roller $b^{20}$, for purposes which will presently appear. The working rollers $b^{11}$ $b^{12}$ are corrugated. The idle-roller $b^{20}$ is preferably smooth.

The action or operation of the parts so far described will be stated after specifying the parts of the drive employed.

To the right-hand drumhead $b^2$ is bolted or otherwise fixed a large crown-gear casting $c$. With the same engages a pinion $c'$ on the inner end of a main driving-shaft $c^2$. The said shaft $c^2$ is journaled in suitable bearings $c^3$ $c^4$, fixed, respectively, to the main frame-piece $a^3$ and to a pedestal-casting $c^5$, fixed to the floor of the building. Another and smaller pinion $c^6$ also constantly engages with the crown-gear $c$ of the drumhead. The said pinion $c^6$ is carried at the inner end of a counter-shaft $c^7$, mounted in a depending bearing-bracket $c^8$, fixed to the frame-piece $a^3$, and in a bearing $c^9$ on a short pedestal-casting $c^{10}$, fixed to the floor inward of the pedestal $c^5$. The said counter-shaft $c^7$ is provided with a gear $c^{11}$, adapted to be engaged by a shifting gear $c^{12}$ on the projecting end of the central shaft $b^{14}$, which carries the working roller $b^{12}$. Outward of the gear $c^{11}$ the counter-shaft $c^7$ is provided with a gear $c^{13}$, which constantly engages with a pinion $c^{14}$ on a common hub with the half member $c^{15}$ of a friction-clutch, which is loosely mounted on the main shaft $c^2$. Another half-clutch member $c^{16}$ is fixed to the shaft $c^2$ and spaced apart from the half-clutch $c^{15}$. Between the clutch members $c^{15}$ and $c^{16}$ is loosely mounted on the shaft $c^2$ a constantly-running double-clutch surface-pulley $c^{17}$. The pulley $c^{17}$ is subject to the action of an armed shipper-fork sleeve $c^{18}$, mounted for sliding motion on the shaft $c^2$, the arms of which extend through the half-clutch $c^{16}$ and engage over a suitable collar in the hub of the pulley $c^{17}$.

The sleeve $c^{18}$ is operated by a shipper-fork lever $c^{19}$, of any suitable construction, but shown as of bell-crank form, pivoted to the outside pedestal $c^5$. The clutch-surfaces are all friction-surfaces. The members $c^{15}$ and $c^{16}$ are spaced apart sufficiently far to render the loose pulley $c^{17}$ idle when in its central position. Hence through the shipper-fork the pulley $c^{17}$ may be thrown into frictional engagement either with the clutch member $c^{15}$ or the clutch member $c^{16}$ at will. If the pulley $c^{17}$ be in engagement with the loose clutch member $c^{15}$, as shown in Figs. 1 and 4 of the drawings, the counter-shaft $c^7$ will receive motion therefrom through the pinion $c^{14}$ and the gear $c^{13}$, and the churn drum or cylinder will be rotated with slow motion, as is desirable for working the butter; and if the shifting gear $c^{12}$ on the shaft $b^{14}$ be in mesh with the gear $c^{11}$ on the counter-shaft $c^7$, as shown in Figs. 1 and 4, the central working roller $b^{12}$ will be positively driven from the counter-shaft. In this butter-working action the bottom of the drum will be moved from the right toward the left. On the other hand, if the loose pulley $c^{17}$ is thrown outward by the shipper-fork, so as to engage with the fixed half-clutch member $c^{16}$ and the shifting gear $c^{12}$ be thrown out of engagement with the gear $c^{11}$ on the counter-shaft, then the main shaft $c^2$ will become operative to rotate the drum at a relatively high rate of speed, as is required in the churning action.

When churning it is of course necessary or desirable to first pin the crank-like hangers $b^9$ $b^{10}$ and the shaft $b^{14}$ fast to the drum-gudgeons $b^7$ after the lever-arms $b^{15}$ have been released from the framework by the removal of the pins $b^{16}$. The working rollers $b^{11}$ $b^{12}$ and the idle-roller $b^{20}$ would then all be locked fast to the bottom of the drum, and the drum would be rotated from left toward the right with reference to Figs. 2 and 5 until the churning was completed. The loose pulley would then be shifted inward to engage with the loose half-clutch $c^{15}$ after the pin had been removed from the hole $b^{17}$ and the lever-arms $b^{15}$ had been pinned fast to the framework, and the drum would then be rotated in the reverse direction, or, as shown by the arrows in Figs. 2 and 5, at a relatively slow rate of speed but with correspondingly-increased power as required to work the butter. After the lever-arms $b^{15}$ were pinned fast to the framework, the crank-hangers $b^9$ $b^{10}$ would become stationary relative to the motion of the drum and would hold the working rollers $b^{11}$ $b^{12}$ and the idle-roller $b^{20}$ in the position shown in Figs. 4 and 5. If the shifting gear $c^{12}$ be thrown into mesh with the gear $c^{11}$ on the counter-shaft $c^7$, as should have been done before shifting the loose pulley $c^{17}$ for turning the drum in the proper direction to work the butter, the central roller $b^{12}$ will receive a positive motion in the direction shown by the arrow. Then, under the rotary motion of the drum, the butter will be gathered and carried up by the drum and dropped from the cleats $b'$ thereof onto the rollers $b^{20}$ $b^{11}$ $b^{12}$. Under the positive action of the roller $b^{12}$ the butter will then be thrown outward into engagement with the idle-roller $b^{11}$, and the said rollers will thereby be turned toward each other. The said rollers $b^{11}$ $b^{12}$ will therefore coöperate to work the butter through between the same and drop it back to the bottom of the drum. In this working action the covers $b^{18}$ for the radial arms $b^{10}$ of the crank-like hangers serve as hopper-like end boards to deflect the butter inward as delivered from the drum-cleats and direct the same onto the working rollers. The idle-roller $b^{20}$ serves as a catch and feed roller for preventing the butter from falling back to the wrong side of the working roller $b^{12}$. After the butter has been worked to the desired extent the gear $c^{12}$ should be shifted outward, so as to throw the working roller $b^{12}$ out of gear with the drive from the countershaft, and the drum be given three or four more turns before stopping the same. When the roller $b^{12}$ is thus thrown out of gear, all of the said internal rollers $b^{11} b^{12} b^{20}$ will become idle and will stand stationary. Hence, under the continued rotation of the drum, from the countershaft or in the working direction, all the butter will be carried up by the drum and collected onto the top of the said rollers $b^{11} b^{12} b^{20}$. On then rotating the drum until the door $b^4$ thereof is directly in front of the roller $b^{11}$ or slightly above the same all of the butter will be readily accessible for removal from the churn.

From the foregoing description it will be seen that my machine is provided with an interchangeable speed-and-power gearing for rotating the drum relatively fast in one direction for churning and relatively slow, but with increased power, in the opposite direction for working the butter; and the said machine is also provided with an extremely-simple construction for operating the central member of the working rollers with a positive action.

Of course it will be understood that minor changes might be made in the details of construction without departing from the spirit of my invention.

Because of the peculiar interchangeable speed-and-power drive described and the angular adjustment of the crank-like hangers $b^9 b^{10}$ to opposite sides of the drum-axis, this machine may be belted to a line-shaft running in any direction, which is a great convenience for adaptation to different situations as to floor-space.

What I claim, and desire to secure by Letters Patent of the United States, is as follows:

1. The combination with a rotary drum having gudgeons, of crank-like hangers comprising hollow axial sections, working through said gudgeons, and radial sections projecting from said axial sections and working inside the drum, a central shaft extending through the hollow axial sections of said hangers, and a pair of working rollers within the drum, one on said shaft and the other journaled in the radial arms of said hangers, substantially as described.

2. The combination with a rotary drum having gudgeons, of crank-like hangers comprising hollow axial sections working through said gudgeons and radial sections projecting from said axial sections and working within the drum, a central shaft working through the axial sections of said hangers, a pair of working rollers within the drum, one fixed to said shaft and the other journaled in the radial sections of said hangers, and means for interchangeably locking said hangers to the fixed frame or to said shaft and gudgeons, at will, substantially as described.

3. The combination with a rotary drum having gudgeons, of crank-like hangers comprising hollow axial sections working in said gudgeons and radial sections projecting from said axial sections, and working inside the drum, a central shaft working through the hollow axial sections of said hangers, a pair of rollers within the drum, one fixed to said shaft and the other journaled in the radial sections of said hangers, means for interchangeably locking said hangers to the fixed frame or to said shaft and gudgeons, at will, and a drive applicable to rotate the drum and said central shaft, independently but simultaneously, when the hangers are locked to the frame, or to rotate the drum, hangers and shaft as one body, when locked together, substantially as described.

4. The combination with the rotary drum having gudgeons, of the crank-like hangers with hollow axial sections $b^9$ in said gudgeons and radial sections $b^{10}$ projecting from said axial sections into the interior of the drum, the central shaft $b^{14}$ working through the axial sections of said hangers, the idle-roller $b^{11}$ journaled in the radial sections of said hangers, the roller $b^{12}$ fixed to said central shaft, the lever-arms $b^{15}$ on the outer ends of said hanger-sections $b^9$, securable to the fixed frame, means for locking said shaft, said hangers and said gudgeons together, a shifting gear $c^{12}$ on the projecting end of said central shaft, the crown-gear $c$ on the drumhead, the main and counter shafts, each with a pinion engaging said drum-gear, the constantly-running double-clutch shiftable pulley $c^{17}$, the half-clutch $c^{16}$ fixed to the main shaft, the half-clutch $c^{15}$ loose on the main shaft and having pinions $c^{14}$, the gear $c^{13}$ on said counter-shaft engaging said pinion $c^{14}$, and the gear $c^{11}$ on said counter-shaft adapted to be engaged, at will, by said shifting gear $c^{12}$ of the working-roller shaft $b^{14}$, all coöperating substantially as and for the purpose set forth.

5. The combination with the rotary drum having gudgeons, of the crank-like hangers comprising hollow axial sections in said gudgeons and radial sections projecting from said axial sections, into the interior of the drum, a central shaft extending through the axial sections of said hangers, the pair of working rollers, one on said shaft and the other journaled in the radial sections of said hangers, and covers for said radial hanger-sections constructed to form hopper-like end walls for the working rollers, substantially as described.

6. The combination with the rotary drum having the gudgeons $b^7$, the internal cleats $b'$ and annular space $b^3$, as described, the crank-like hangers $b^9$ $b^{10}$, as described, the shaft $b^{14}$ working through the axial sections of said hangers, the corrugated rollers $b^{11}$ journaled in the hanger-sections $b^9$, the corrugated roller $b^{12}$ on the shaft $b^{14}$, the covers $b^{18}$ for said hanger-sections $b^9$ and provided with the beveled surfaced flanges $b^{19}$ working in said annular space $b^3$ and the combined catch and feed roller $b^{20}$ journaled in said covers $b^{18}$, all arranged and operating substantially as described.

In testimony whereof I affix my signature in presence of two witnesses.

LEVI A. DISBROW.

Witnesses:
GEO. EDGERTON,
C. J. O'BRIEN.